April 2, 1929. J. H. McFARLAND 1,707,360

METHOD FOR CONDITIONING BEANS

Filed March 28, 1927

INVENTOR
John H. McFarland
BY
George B. Willcox
ATTORNEY

Patented Apr. 2, 1929.

1,707,360

UNITED STATES PATENT OFFICE.

JOHN H. McFARLAND, OF MERRILL, MICHIGAN, ASSIGNOR OF ONE-FOURTH TO FRANK B. WALCOTT, OF WHEELER, MICHIGAN.

METHOD FOR CONDITIONING BEANS.

Application filed March 28, 1927. Serial No. 178,855.

This invention is a method for conditioning beans.

An object of my invention is to provide a method by which field beans as threshed can be economically and rapidly freed of dirt and dust and polished fit for delivery to the roll picker which separates the rough and split beans from the good smooth beans.

Another object is to make the above mentioned cleaning and polishing method adaptable also for removing excess moisture and for converting to commercial whiteness beans that have been water-soaked and consequently are of a dull grey appearance, or beans that have been slightly frosted to a slight yellowish brown. Wrinkled bean surfaces are made smooth.

Cleaning, polishing and blanching steps constitute the complete process of what is known in the bean business as conditioning.

The objects are attained without the aid of chemical reagents or fumes and the equipment required for large tonnage production is of the simplest nature. In fact, the method itself is capable of being performed by hand and is not dependent upon any specific machine for its successful operation. A suitable machine is described and claimed in my co-pending application Serial No. 172,283, filed March 3, 1927. This case discloses parts of the inventive matter in the earlier case.

With the foregoing and certain other objects in view, which will appear later in the specification, my invention consists of the devices described and claimed and the equivalents thereof.

The improvement consists in agitating the crude beans by flowing, pouring and tumbling them in a closed vessel so that the individual beans are repeatedly struck against their neighbors and at the same time are subjected to the action of a polishing material, such as granulated beans, sawdust, corn meal or the like and simultaneously forcing a stream of air around and through the material. The air if heated will produce the blanching effect referred to without interrupting the polishing operation.

For purposes of description reference may be had to the accompanying drawings showing in Fig. 1 a diagrammatic side view, broken away in part, of a revolving barrel or drum such as commonly used for conditioning beans.

Figure 1:
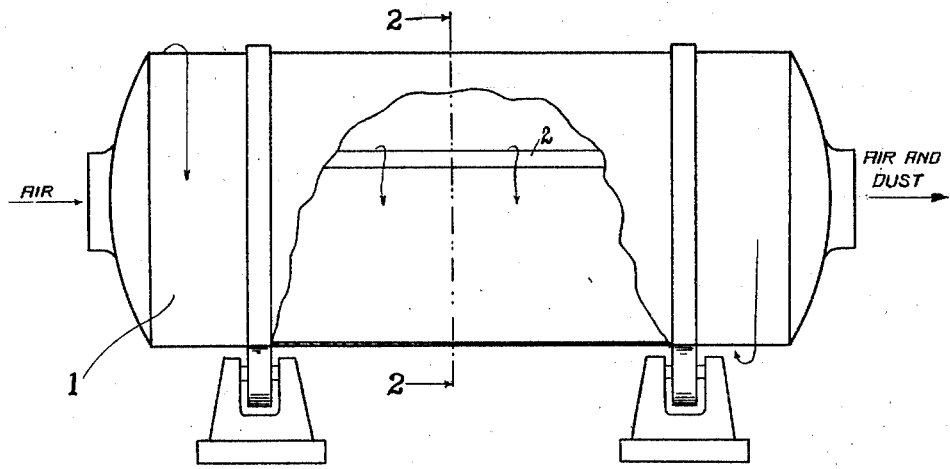
Figures 2, 3:
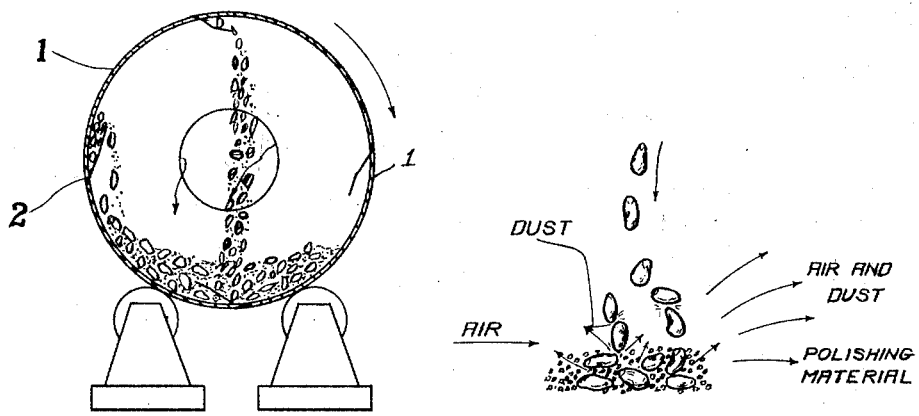
Fig. 2 is a transverse section on line 2—2 of Fig. 1.
Fig. 3 is a detail view showing the action of simultaneous impingement, polishing and air blasting.

As is well known, field beans after being harvested and threshed are more or less covered with fine powdery dust and sometimes they carry adhering pieces of dirt. Their skins underneath the dust may vary in texture all the way from smooth to rough and in color from white to dull grey or yellowish brown. In the lot are small deformed beans, splits and sometimes pieces of pod fibre and even small loose pebbles and pieces of hardened mud, as well as beans with wrinkled skins.

The performance of cleaning, polishing and whitening such crude material at the rate of five thousand to six thousand pounds in a run of from one to three hours, depending somewhat upon the excess moisture content of the beans, is a normal function of my improved method of conditioning.

In operating the method the material is put into a closed receptacle, such as an axially revolving drum 1, along with a suitable quantity of ground-up beans or other polishing material, the mixture filling the drum about one-third full. Air, either at atmospheric temperature, or a temperature of, say, sixty five to one hundred fifty degrees centigrade, depending upon whether blanching of discolored beans is desired, is directed into the drum against the material while it is being lifted, poured, dropped and tumbled by the flights 2 in the drum. The surface impacts caused by tumbling and falling loosen and lightly pound off the dust and gritty particles that adhere to the beans in their crude state, while the rubbing and scouring action of the beans against each other and against the granules of the polishing material removes all dirt that is merely loosened by the impact.

So far, the steps described constitute the usual closed tumbling barrel method, with the exception of the heated air step. From this point the present invention takes an important step in advance, by not allowing the dust and dirt to settle back into the material, but instead carrying it clear from the mass of material and out from the drum as soon as the above described impact and rubbing actions have released it. To do this a strong air current is kept in play upon the tumbling material, the air flow into and out from the drum being strong enough to keep the dust and finer dirt particles in suspension and carry them off, but not strong enough to blow the granules of polishing material out of the drum. Preheating the air is not absolutely necessary for this first step.

As a result of this simultaneous tumbling, rubbing, scouring or wiping and air blasting the polishing material is kept quite free from dust and the beans are surface-cleaned to a high polish, so that when later separated from the granular polishing material by screening they are fit to go direct to the picker rolls.

Without such an air blasting operation the material must be repolished by a relatively costly operation in a brush polishing machine before going to the picking rolls, because all dust and dirt released by agitating and scouring remains on the beans after tumbling is completed and impairs the effectiveness of the picking rolls.

In the foregoing description of the air blasting step the function of the air current has been set forth as regards removing the liberated dust and keeping the polishing material relatively clean. I will now describe certain new and useful results attained by heating the air, inviting particular attention to the fact that although circulation of heated air through a tumbling mass of material is, broadly considered, an old and well known operation, as for example, in salt drying, rice polishing etc., yet when applied to the conditioning of beans results are produced that have never before been attained in that art and their attainment is the result of invention.

So far as I am aware, this method is the first by which beans are whitened, wrinkles are removed from the skin surface and the beans are kept whole without danger of splitting, all while the operation of polishing and dust removal is being performed in the manner which I have already described.

Blanching appears to be brought about in the following manner: Stained beans seem to get their color from the pods that have been wet, causing a coffee colored stain that dries on, but is capable of being removed by wiping when moistened. The heat of the incoming air warms the outer surfaces of the beans so they commence to give off their excess moisture, the stain softens and is wiped off by the tumbling action of the polishing material, thus removing the color and whitening the beans. Wrinkled skins are remedied to a marked extent, as can be seen by inspecting the beans before they are subjected to the process and afterwards. Beans that are slightly wrinkled are quickly converted into smooth beans of prime appearance and much saving by reclaiming takes place. Here again, the action is apparently due to the heated air, for observance of samples taken during a three hour run at intervals of, say fifteen minutes, shows that when the beans begin to give off their excess moisture they swell slightly, the wrinkled skin softens and fills out smooth, and after the excess moisture has disappeared by the drying action of the air the bean remains of the same size and the skin is tight and smooth.

It has been commonly believed that highly heated air can not be used in drying beans and it is well known that a blast of heat discharged, even for a few seconds, against a quantity of beans at rest or slightly in motion, will result in splitting them, the splitting action commencing within a few seconds and increasing rapidly.

No such bad results is attained in the method herein described. An air temperature of one hundred fifty degrees centigrade does not cause the beans to split, evidently because the beans are being tumbled and poured and agitated while the current of heated air is being applied to them upon all sides. Whatever the reason, the fact remains that practically no splitting occurs.

In the foregoing description I have mentioned the use of a polishing material. Under ordinary circumstances it is very desirable to use some granular substance, as ground beans. If, however, the crude beans are not very dirty, a less amount of polishing material can be used, and if the beans are quite free from dirt it is permissible in some cases to dispense with the polishing material.

Discolored beans can be blanched during the polishing operation as above noted by properly heating the air before it enters the drum. The blanching effect of heating the air before it goes to the drum is in practice very pronounced and is commercially important because a large part of the usual discard on account of color and wrinkles can be automatically reclaimed by carrying on the conditioning method in the manner described.

Having thus described my invention, what I claim and desire to secure by Letters Patent is:

1. The method of conditioning beans that consists in agitating the beans in the presence of granular polishing material in such manner as to cause the beans to hit against each other and thereby knock particles of dust and dirt from their surfaces, and simultaneously directing against the material while being so agitated, a stream of air heated to between one hundred degrees and one hundred fifty degrees centigrade, and of force sufficient to carry said particles of dust clear from the mass of material without carrying away the granules of polishing material.

2. The method of conditioning beans that consists in agitating the beans in the presence of granular polishing material of moisture-absorbing character in such manner as to cause the beans to hit against each other and thereby knock particles of dust and dirt from their surfaces, and simultaneously directing against the material while being so agitated, a stream of air of force sufficient to carry said particles of dust clear from the mass of material without carrying away the granules of polishing material.

3. The method of conditioning beans that consists in agitating the beans in the presence of granular polishing material having capacity for absorbing moisture by surface contact with the beans, and simultaneously directing against the material while being so agitated, a stream of air of force sufficient to carry said particles of dust clear from the mass of material without carrying away the granules of polishing material.

4. The method of conditioning beans that consists in agitating the beans in the presence of granular polishing material in such manner as to subject the beans to impact and thereby knock particles of dust and dirt from their surfaces, and simultaneously directing against the material while being so impinged a stream of air of force sufficient to carry said particles of dust clear from the mass of material without carrying away the granules of polishing material.

5. The method of conditioning beans that consists in agitating them while simultaneously directing against them a stream of heated air of temperature between sixty-five and one hundred fifty degrees centigrade to drive off their excess moisture and to carry away particles of dust released by such agitating.

6. Removing wrinkles in the skin surfaces of beans, by agitating them and simultaneously directing against them a flow of heated air at temperature sufficiently high to cause liberation of their excess moisture and consequent swelling accompanied by softening of the skin.

7. Conditioning beans by agitating them with mutual impingement to loosen adherent dust, and simultaneously directing against them a flow of heated air adapted to liberate their excess moisture, whereby to smooth the external surfaces and eliminate wrinkles therein.

8. Blanching the skin surfaces of beans, by repeatedly agitating them in the presence of a granular material and simultaneously directing against them a flow of heated air at temperature sufficiently high to liberate their excess moisture and thereby soften the surface discoloring material to permit such material to be removed by the wiping action of said granular material.

In testimony whereof, I affix my signature.

JOHN H. McFARLAND.